United States Patent Office 3,226,406
Patented Dec. 28, 1965

3,226,406
**WAX ESTER SUBSTITUTE FOR JOJOBA OIL FROM THE SEED OF *LIMNANTHES DOUGLASII***
Thomas K. Miwa and Ivan A. Wolff, Peoria, Ill., assignors to the United States of America as represented by the Secretary of Agriculture
No Drawing. Filed Jan. 3, 1963, Ser. No. 249,300
1 Claim. (Cl. 260—410.9)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention relates to the preparation of a liquid wax ester and the corresponding hydrogenated solid wax ester, the properties of which respective forms are practically indistinguishable from those of the natural liquid ester wax obtained as the "oil" present in the seed of *Simmondsia chinensis* (jojoba) and the solid wax obtained by hydrogenating jojoba oil.

The natural liquid ester wax that is commonly called jojoba oil has a structure and properties that have led to well defined uses as a raw material for the preparation of a variety of lubricants, pharmaceuticals, etc. (Journal of Ag. and Food Chem., 6, 118 (1958). However, the relatively short supply of jojoba oil and its extremely desirable properties have cooperated to maintain a rather high price that prevents its use for the commercial preparation of a large number of less expensive but nevertheless obvious and useful derivatives and products.

One object of our invention, therefore, is the preparation from a hitherto untapped plant source of a liquid wax ester that is essentially indistinguishable from and that can be used in place of jojoba oil. Other objects will appear in the following detailed disclosure.

*Limnanthes douglasii* (meadowfoam) is a hardy annular herb native to California and adjoining Pacific Coast States. It is grown as a garden ornamental. Our group has previously reported that the seed oil of *Limnanthese douglasii* contains a large amount of constituent fatty acids, 94 percent of which are longer than $C_{18}$, and that gas-liquid chromatography (GLC) analyses show that over 97 percent of the total fatty acid content is unsaturated, as indicated in applicants' prior publication in the Journal of the American Oil Chemists Society, 39, 320–322, July 1962.

In accordance with the principal object of the invention we extracted the triglyceride oils from ground seed of *Limnanthes douglasii*, saponified the triglycerides to form the soaps, and acidified the latter to obtain the free acids. Fatty alcohols corresponding to the essentially unsaturated Limnanthes fatty acids were obtained by sodium reduction of the triglycerides essentially by the procedure of Hansley, Ind. Eng. Chem., 39, 55 (1947). Our novel liquid wax esters were then prepared by a p-toluenesulfonic acid catalyzed reaction of the Limnanthes fatty acids with the corresponding fatty alcohols, equilibrium being prevented by constant removal of water of reaction. Hydrogenation of the obtained liquid wax esters to form the solid wax was conducted by the method of Ogg et al., Anal. Chem., 21, 1400 (1949). Table I shows the strikingly similar physical properties of the liquid wax ester prepared from the reaction of Limnanthes acids and alcohols compared with those of the liquid wax ester found naturally as jojoba seed oil.

TABLE I

|  | Limnanthes wax esters | Jojoba wax esters |
|---|---|---|
| Freezing point, C | 5 to 3 | 12 to 7 |
| Density g./ml. at 25° C | 0.866 | 0.860 |
| Viscosity, centistokes at 25° C | 38.6 | 58.4 |
| Viscosity, centistokes at 37.8° C. (100° F.) | 25.2 | 27.0 |
| Refractive index $n_D^{25}$ | 1.4656 | 1.4650 |
| Melting point after hydrogenation | 66 to 68 | 66 to 68 |

The following specific example will further illustrate our invention.

*Example 1*

1500 g. of *Limnanthes douglasii* seed that had been ground in a 6 in. hammer mill was Soxhlet-extracted with petroleum ether (B.P. 33–57° C.) for 60 hours. The solvent was removed by bubbling nitrogen through the solution while heating the latter with a mantle at about 80° C. to a constant weight, thus providing 370 gm. (24.7%) of an oil characterized by a viscosity of 85 cp. at 25° C., a Wijs iodine value of 87 and an acid value of 1.4. Free fatty acids were obtained by saponifying 50 gm. of the triglyceride oil in 300 ml. methanol by adding 2 meq. of KOH and 1 meq. of water per calculated meq. of fatty acid (saponification value of oil 168) and refluxing for 2 hours. Then 1000 ml. of water was added, and the unsaponifiables were extracted with ethyl ether. The ether extract was washed with 1 N $K_2CO_3$ and then distilled water, and the washings added back. The acids were freed with dilute HCl and extracted with ethyl ether, the ether extract washed with water, and the ether removed at reduced pressure and somewhat elevated temperature under an atmosphere of nitrogen. The yield of recovered acids was 98 percent of theory. The neutral equivalent of the mixed free acids was 320±3 (4 samples).

Limnanthes fatty alcohols were obtained by subjecting 50 gm. of the triglyceride oil to reduction with sodium in methyl isobutyl carbinol and toluene. The sodium alkoxides formed (0.63 mole) were hydrolyzed in the original reaction flask by refluxing first with 100 ml. of water and then with a 1 percent excess of HCl. The acidulated system was cooled and washed with ethyl ether to extract all the organic compounds. The ether extract was washed with water, concentrated, and the fatty acids present removed by extracting from ethyl ether with 0.5 N NaOH followed by adsorption on activated alumina, using ethyl ether as an eluting solvent. The thusly purified mixed fatty alcohols were washed with water and concentrated to constant weight. The yield was 94 percent of theory, and 97.5 percent of the yield consisted of unsaturated alcohols, as shown by applicants' prior publication, supra.

The Limnanthes liquid wax ester product was prepared by reacting 1.15 parts by weight of the mixed fatty acids (1.10 mole eq.) with 1.0 part by weight (1.0 mole eq.) of the mixed fatty alcohols in 34.5 parts by weight of xylene (100 mole eq.) and in the presence of 0.0093 part by weight of p-toluenesulfonic acid monohydrate (0.015 mole eq.). Yield of the purified liquid wax esters was 91 percent of theory. The corresponding solid, hydrogenated wax esters having a M.P. of 66–68° (identical with that of hydrogenated jojoba wax esters) were recovered quantitatively.

We claim:

A liquid wax ester product produced by the method comprising:

(a) solvent extracting the glyceride oil present in ground seed of *Limnanthes douglasii*;

(b) removing the solvent;
(c) separately preparing the mixed constituent fatty acids by saponification and the mixed corresponding fatty alcohols from separate portions of the said glyceride oil by reduction; and
(d) reacting 1.10 mole equivalent of said constituent fatty acids with 1.00 mole equivalent of said fatty alcohols in the presence of 100 and 0.015 mole equivalents, respectively, of xylene and p-toluenesulfonic acid monohydrate to form the desired liquid wax ester product.

References Cited by the Examiner
UNITED STATES PATENTS
2,628,249   2/1953   Bruno _____ 260—410 XR OTHER REFERENCES
Earle et al.: Jour. Am. Oil Chem. Soc., vol. 36 (1959), pp. 304–307.
Gunstone, An Intro. to the Chem. of Fats and Fatty Acid, J. Wiley and Sons Inc., New York (1958), p. 85.
Hansley, Chem. Abs., vol. 41 (1947), pp. 1202–3.

CHARLES B. PARKER, *Primary Examiner.*